United States Patent [19]

Scola et al.

[11] Patent Number: 4,569,988
[45] Date of Patent: Feb. 11, 1986

[54] POLYIMIDES OF 4,4'-(HEXAFLUOROISOPROPYLIDENE)BIS-(O-PHTHALIC ANHYDRIDE) AND ALIPHATIC DIAMINES

[75] Inventors: Daniel A. Scola, Glastonbury, Conn.; Ruth H. Pater, Rocky River, Ohio

[73] Assignee: United Technologies Corporation, Hartford, Conn.

[21] Appl. No.: 685,936

[22] Filed: Dec. 24, 1984

[51] Int. Cl.$^4$ .............................................. C08G 73/10
[52] U.S. Cl. ................................. 528/353; 156/331.5
[58] Field of Search ........................................ 528/353

[56] References Cited

U.S. PATENT DOCUMENTS

| | | | |
|---|---|---|---|
| 3,310,573 | 3/1967 | Coe | 260/346.3 |
| 3,356,648 | 12/1967 | Rogers | 528/353 |
| 4,063,984 | 12/1977 | Critchley | 528/353 |
| 4,336,175 | 6/1982 | Gibbs | 528/353 |

FOREIGN PATENT DOCUMENTS

| | | | |
|---|---|---|---|
| 1062435 | 3/1967 | United Kingdom . | |
| 1216505 | 12/1970 | United Kingdom | 528/353 |

Primary Examiner—Lester L. Lee
Attorney, Agent, or Firm—A. Dean Olson

[57] ABSTRACT

A low temperature processable, thermoplastic polyimide and methods for making and using the same. The polyimide has repeating polymer units of the formula

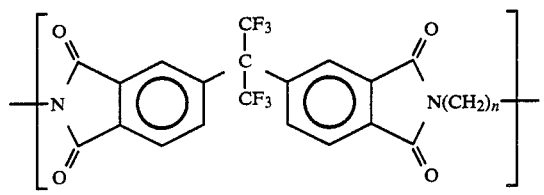

wherein n is 2 to about 20 and the molecular weight of the polymer chain is about 5,000 to about 50,000. The polymer is made by reacting 4,4'-(hexafluoroisopropylidene)bis(o-phthalic anhydride) with a diamine having the formula $H_2N(CH_2)_nNH_2$ wherein n is 2 to about 20 to form a polyamic acid. The polyamic acid is imidized to form the polyimide described above. The polyimide is particularly adapted to use as a hot melt adhesive by placing it between two articles and applying heat and pressure.

5 Claims, No Drawings

POLYIMIDES OF 4,4'-(HEXAFLUOROISOPROPYLIDENE)BIS(O-PHTHALIC ANHYDRIDE) AND ALIPHATIC DIAMINES

CROSS-REFERENCE TO RELATED APPLICATIONS

Attention is directed to commonly assigned copending application, A Low Temperature Processable, Moisture Resistant, Polyimide and Composite, D. Scola and R. Pater, Ser. No. 685,937 filed on even date herewith, which discloses material similar to that used in the present application, the disclosure of which is incorporated by reference.

TECHNICAL FIELD

The field of art to which this discovery relates is polyimide particularly adapted to use as hot melt adhesives and methods of making the same.

BACKGROUND ART

Modern aerospace technologies have placed increasing demands on polymer technology. Polymeric materials used in this environment should exhibit a variety of physical properties such as low temperature processability, strength, moisture resistance and solvent resistance. Although polymeric compounds exist that exhibit one or more of the above physical properties, these materials generally do not have the desired combination necessary for many applications.

For instance, the popular commercial epoxies provide good strength as adhesives yet they are very susceptible to moisture which causes swelling. Swelling results in dimensional changes which may cause application problems where tight tolerances are required. In addition, swelling results in the loss of mechanical properties such as strength. Another class of polymers, polysulfones, exhibit good thermoplastic processing characteristics and good strength yet they are not very resistant to many solvents including moisture. By contrast polyimides generally exhibit poor processability by typical thermoplastic techniques but provide good resistance against a number of solvents. However, even polyimides generally absorb moisture resulting in swelling and loss of mechanical properties.

Accordingly, there is a continual search in the art for polymeric compounds exhibiting improved physical properties.

DISCLOSURE OF INVENTION

This discovery is directed to a low temperature processable, thermoplastic polyimide material. The polymeric compound exhibiting these physical characteristics has repeating polymer units of the formula

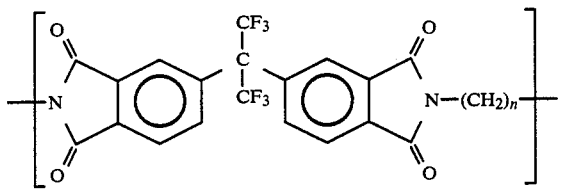

wherein n is 2 to about 20 and the molecular weight of the polymer chain is about 5,000 to about 50,000.

Another aspect of this invention is a method of making such a thermoplastic polyimide by reacting 4,4'-(hexafluoroisopropylidene)bis(o-phthalic anhydride) with a diamine having the formula $H_2N(CH_2)_nNH_2$ where n is 2 to about 20. These compounds react to form the intermediate polyamic acid. Next, the polyamic acid is imidized to form the polyimide described above.

Yet another aspect of this invention is the use of a polyimide as a hot melt adhesive. Two articles can be securely bonded together at temperatures below about 190° C. A polyimide having such a repeating polymer unit and molecular weight as described above is placed between the two articles to be bonded and pressure and heat are supplied to bond the articles firmly together.

This discovery provides a synthetic polymer with significantly improved physical properties for a variety of applications including the aerospace industries. By incorporating a hexafluoroisopropylidene moiety into a polyimide, a polymer has been developed that exhibits for example, easy low temperature processing. These improved characteristics and others are important for the applications for which these resins have their most popular uses.

Other features and advantages will be apparent from the specification and claims which describe an embodiment of the invention.

BEST MODE FOR CARRYING OUT THE INVENTION 4,4'-(hexafluoroisopropylidene)bis(o-phthalic anhydride) hereinafter referred to as 6F dianhydride has been available commercially and can also be made as set forth in U.S. Pat. No. 3,310,593 and Belgium Pat. No. 649,366, the disclosures of which are incorporated by reference. Briefly, the 6F dianhydride can be synthesized by a multistep process. Ortho-xylene available from Aldrich Chemical Company and hexafluoroacetone sesquihydrate available from I.C.N. Pharmaceuticals, Inc. react in the presence of the Friedel-Crafts catalyst, hydrogen fluoride available from Matheson Gas Products, Inc. to form 4,4'-(hexafluoroisopropylidene)bis(o-xylene). Upon isolation this compound can be oxidized with nitric acid or potassium permanganate to form the corresponding tetra acid. The tetra acid can be dehydrated to form the corresponding dianhydride, 4,4'-(hexafluoroisopropylidene)-bis(o-phthalic anhydride) commonly referred to as 6F dianhydride.

The alkane diamines utilized in this invention have the formula $H_2N(CH_2)_nNH_2$ where n is 2 to about 20 and are commercially available generally from Aldrich Chemical Company under the names α,ω-diaminoalkanes. It is preferred that n is about 10 to about 14 and especially preferred that n is 12 because it is believed that adhesion and the glass transition temperature (Tg) both decrease as the alkyl content of the polymer unit increases. The inclusion of one or more aliphatic or unsaturated diphatic diamines other than disclosed, e.g. 1, 2, diamino propane, 1, 2 diamino 2-methylpropane to the extent that they do not detract substantially from the desirable results obtained with the stated reactants are contemplated in the formation of these prepolymers and polymers.

The polyimide resin of this disclosure hereinafter referred to as poly 6F diimide has repeating units of the formula

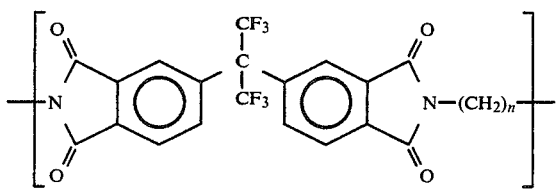

wherein n is 2 to about 20. It is preferred that n is about 10 to about 14 and especially preferred that n is 12. The molecular weight of the resin, which can also be referred to as the prepolymer, is about 5,000 to 50,000. Also, depending on the solvents, initiators and inhibitors used, the polymer chains may have various functional end groups, such as a solvent molecule.

After isolation of the above resin, further processing (exposing the polymer to heat and pressure for instance, as a hot melt adhesive), increases the molecular weight of the polyimide while retaining the same repeating polymer unit. The molecular weight of the polymer chain is such that the polyimide absorbs below about 0.20 percent (%) by weight moisture at room temperature. Percent by weight moisture refers to moisture absorbed (gms) divided by initial dry polymer weight multiplied by one hundred. At this molecular weight the polyimide has a Tg of about 150° C. It is difficult to determine a molecular weight number as the polyimide is not soluble in many conventional solvents used in molecular weight determination procedures, for example molecular weight measurement by an intrinsic viscosity measurement. It is believed that the molecular weight is greater than 50,000 as that is typically the minimum necessary to achieve minimum moisture absorption of about 0.1 to 2% weight. It is also believed that the molecular weight is less than 200,000 as molecular weights above 200,000 are difficult to achieve. It is also believed that the polymer exhibits liquid crystal orientation. Liquid crystals are crystals in which the polymer units are arranged in parallel arrays to form an ordered pattern of molecules which exhibit crystalline-like properties, e.g. high strength, stiffness.

Polyamic acid can be synthesized by mixing a solution of the 6F dianhydride with a solution of the diamine having the formula $H_2N(CH_2)_nNH_2$ where n is about 2 to about 20 to produce the polyamic acid intermediate by an amidization process. Empirically this can be illustrated as:

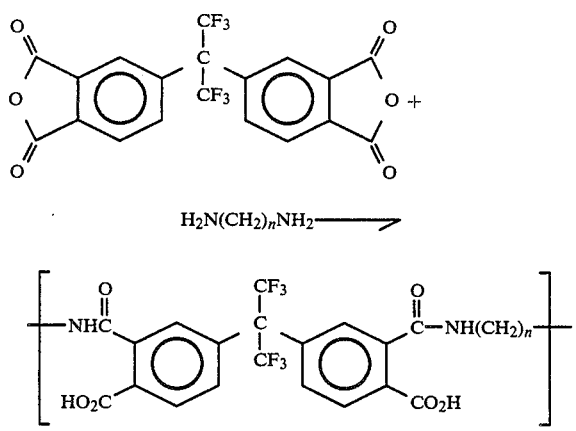

The polyamic acid can be imidized to form the polyimide resin of this disclosure. Imidization refers to the cyclic condensation (dehydration) of the amide and acid group to an imide by for example the addition of heat. Empirically this can be illustrated as:

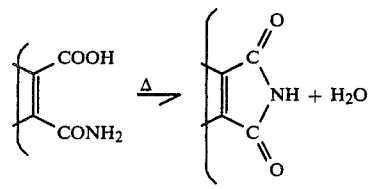

Thus, 6F dianhydride is dissolved in a 1 part chloroform to 3 parts acetone solution. The diamine is dissolved in a chloroform solution. Other suitable solvent(s) may be substituted in varying proportions for the above solvents. The two solutions are then mixed together, preferably, by adding the 6F dianhydride solution over time, about 25 to 30 minutes to the diamine solution at temperatures conventional in the art including room temperature. Upon mixing, the monomers amidize to form polyamic acids of particular molecular weights.

It will be known to those skilled in the art to vary the process parameters to obtain polymer chains having the desired physical properties. These process parameters include addition time, temperature, pressure, solvents, monomer proportions, concentrations, initiators, inhibitors, etc. For instance if the two monomers are combined in a 6F dianhydride to diamine molar proportion of 1.0 to 1.05, a higher molecular weight occurs than if they are combined in 1 to 1 molar ratios. Conversely a 6F dianhydride to diamine molar proportion of 1.20 to 1.0 results in polymers of lower molecular weights than one to one ratios. Depending on the choice of specific process parameters the process specifications may have to be adjusted but these changes are conventional in the art.

The polyamic acid intermediate formed in the chloroform-acetone solution precipitates out as a white solid which can be filtered and air dried. This polyamic acid intermediate is dissolved in a suitable solvent such as β-methoxyethanol (Cellosolve ™ solvent, Union Carbide) and refluxed for about two hours. The poly 6F diimide product can be isolated by, for example, aqueous precipitation followed by filtration and drying. The resultant polyimide has a molecular weight of about 5,000 to about 50,000.

EXAMPLE 1

A solution of 6F dianhydride (113.6 grams (g), 0.25 mole) in a chloroform-acetone 250 milliliters (ml)/750 ml was added dropwise to a solution of 1,12 diamino dodecane (47.5 g, 0.238 mole) in chloroform (200 ml) at room temperature over a period of one-half hour. The polyamic acid intermediate, which precipitated out, was filtered and air dried yielded a white solid (159 g). The polyamic acid intermediate was dissolved in 200 ml cellosolve and heated to reflux for two hours. After cooling, water was added to precipitate the polymer. An orange-brown solid, poly(N,N'-dodecamethylene)-4-(hexafluoroisopropylidene diphthalimide) hereinafter referred to as 6F-1,12-DDA was filtered from the solution and dried to yield about 155 g (97–99% yield) 6F-1,12-DDA.

Poly 6F diimides have a variety of uses including their use as adhesives and coatings. The polymer may be utilized in its neat form or, in conjunction with other fillers, additives and compounds that impart the desired properties and economics to the product. For example, it can be used in a preform laminate for a thermoforming structure. The resin can be melted to form tough films analogous to Kapton TM or Mylar TM films (DuPont de Nemours, E. I., Company) for use in similar applications.

This resin is also an effective hot melt adhesive. It need only be placed between two articles under pressures of about 25 pounds per square inch (psi) to about 200 psi to bind them together when exposed to temperatures less than about 250° C., preferably less than 190° C., and more preferably about 170° C. over a period of less than about two hours, preferably about five minutes to about twenty minutes. After this processing the resin is further polymerized to the higher molecular weight form described earlier. The minimum thickness of polymer required to obtain good bonding is six mils. Typically the resin is applied to the article to be bonded (adherend) after being dissolved to about 25–50% by weight in a suitable solvent such as chloroform or cellosolve. Virtually any articles can be secured together including for instance, the bonding of panels to door compartments in helicopters. Other typical aerospace applications include the bonding of an airfoil skin to the body frame, and airfoil skins to aerodynamic structures such as propellers.

EXAMPLE 2

61.35 g of the polyimide prepared in the previous example was dissolved to 107.6 g of chloroform, and further diluted with 16.4 g methylethyl ketone yielding a 49% solids solution. Two aluminum strips (adherends) one inch by four inches by 0.25 inch were etched with chromic acid and immediately thereafter, a half inch section of each was coated with enough polyimide resin solution to form a thickness of ten mils. The solvent was evaporated off at room temperature and then further dried at 50° C. under vacuum conditions for one hour. Next, the strips were joined. Following this the adherends are placed in a press preheated to 177° C. for 15 minutes at 25 psi yielding an adhesive joint of about 6 mils in thickness. After cooling the adhesive joint resulted in the tensile lap shear strengths described in Table I.

Poly 6F diimide exhibits a combination of desirable qualities unavailable in other polymer systems. The following text, data and explanations illustrate these properties and compare them to the properties of other typical commercial polymeric materials. The poly 6F diimide utilized in the following data is 6F-1,12-DDA polyimide, a polymer having repeating units of the formula

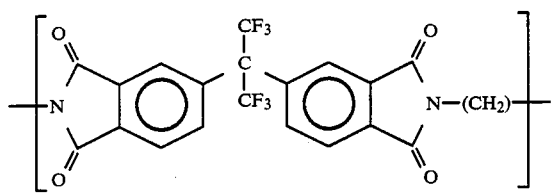

and a molecular weight of about 5,000–50,000.

This polyimide can be processed to the higher molecular weight polymer quickly typically at temperatures and pressures of about 190° C. and about 25 psi. Other polymers used in these applications usually require higher temperatures, pressures, and longer process times. For instance, epoxy processes at about 210° C., and about 100 psi in about 2–3 hours.

6F-1,12-DDA polyimide resin exhibits easy low temperature processing to the high molecular weight form. However, it does not achieve this at the expense of mechanical properties. Overall the resin has equivalent or better adhesive properties when compared to other typical commercial resins. For example, Table I illustrates the resin's tensile lap shear strength in comparison to that of other commercial polymers in its application as a hot melt adhesive. Tensile lap shear strength is a measure of the adhesive strength of the adherend-adhesive interface or a measure of the cohesive strength of the adhesive, depending on where failure occurs. The footnotes are important as they illustrate that although strenths may be roughly equivalent the polyimide resin is the resin of choice because of the combination of other properties that it exhibits.

TABLE I

| Adhesive Properties of Hot Melt 6F-1,12-DDA Resin and Other Adhesives | | | |
|---|---|---|---|
| | Tensile Lap Shear Strength[1] | | |
| | RT psi | 82° C. psi | 100° C. psi |
| 6F-1,12-DDA | 7694[2] | | 5086[2] |
| 6F-1,12-DDA | 5221[2] | | 4240 |
| Epoxy TM (Ciba-Geigy Corp.) | 4000–6000[3] | | |
| Acrylate TM (Loctite Corp.) | 3000–6000[4] | | |
| P1700 TM (Union Carbide Corp.) | | | |
| Polysulfone | 3500 | 2700 | |

[1]Chromic acid etched aluminum adherends.
[2]Processed at 177° C., 15 minutes.
[3]Required 2–3 hours processing.
[4]Poor moisture resistance.

Table II illustrates the moisture absorption properties of 6F-1,12-DDA polyimide in the high molecular weight form in comparison with other commercial materials. It is clear that this polymer makes a significant advancement in the art as the other polymers absorb at least three times as much moisture. As was explained in the Background Art section the absorption of moisture is a significant problem as it results in swelling and the loss of mechanical properties.

TABLE II

| Moisture Absorption Properties of High Molecular Weight 6F-1,12-DDA Compared with Commercial Products | | |
|---|---|---|
| | Wt %[1] Moisture Absorbed at Room Temperature Moisture Exposure Time | |
| Resins | 24 hrs. | 48 hrs. |
| 6F-1,12-DDA | 0.19 | 0.27 |
| Epoxy | | |
| 3501-6 TM (Hercules Inc)[2] | 1.20 | |
| 5208 TM (U.S. Polymeric)[3] | 1.50 | |

TABLE II-continued

Moisture Absorption Properties
of High Molecular Weight 6F-1,12-DDA
Compared with Commercial Products

| Resins | Wt %[1] Moisture Absorbed at Room Temperature Moisture Exposure Time | |
|---|---|---|
| | 24 hrs. | 48 hrs. |
| Polyimide PMR-15 ™ (NASA)[4] | 0.60 | |

[1]Moisture absorbed (gms) divided by initial dry weight multiplied by one hundred.
[2]Value from Augl, J. M. Moisture Sorption and Diffusion in Hercules 3501-6 Epoxy Resin, Naval Service Weapons Center White Oak Laboratory Technical Report (NSCW/WOL TR) 79-39, March 30, 1979.
[3]Value from Augl, J. M. and Bergen, A. W. The Effect of Moisture on Carbon Fiber Reinforced Epoxy Resin Composites, NSWC/WOL TR 76-7, September 23, 1975.
[4]Actual test by inventor.

Typical polymers for the above-described applications may come in contact with other solvents besides water. If a polymer degrades upon exposure to a particular solvent, that polymer system is precluded from use in applications where the solvents are present. Table II shows the effect of a variety of solvents on high molecular weight 6F-1,12 DDA and a polysulfone P1700, a typical commercial polymer used in the application described above. Clearly the polyimide is a superior material as it is less sensitive to many of the solvents tested.

TABLE III

Solvent Effects on High Molecular Weight 6F-1,12-DDA and P1700

| Solvent | P1700 Polysulfone | 6F-1,12 DDA |
|---|---|---|
| Jet Propulsion Fuel JP-5 | swells | no charge |
| n-hexane | no change | no change |
| isopropanol | no change | no change |
| mineral oil | swells | no change |
| Delco Supreme II ™ brake fluid (General Motors Co.) | swells | no change |
| Transmission Fluid (Monarch Co.) | swells | no change |
| chloroform | dissolves | swells & disintegrates (still solid) |
| Toluene | dissolves | swells & disintegrates (still solid) |
| Methylethylketone | dissolves | swells |
| N—methylpyrroldinone | dissolves | swells & disintegrates |
| o-dichlorobenzene | dissolves | swells & disintegrates (still solid) |

The properties and characteristics of the polyimide relate to its structure and composition. Those skilled in the art will understand that the above-described physical properties can vary depending on molecular weight, molecular weight distribution, functional end groups, etc. These properties can be tailored to the particular use.

This discovery advances the field of polymeric technology by providing a polyimide that has a unique combination of desired properties. This polyimide can be processed quickly and at reduced temperatures and pressures in comparison to most other commercial resins. In addition, its substantial moisture and solvent resistance make it suitable for a wide variety of applications as an adhesive where solvents in either gaseous or liquid form are present.

Significantly, poly 6F diimides attain these characteristics without sacrificing mechanical properties. Thus, in the high molecular weight form its strength is comparable if not better than many other polymers that are typically used for the same applications. By incorporating a hexafluoroisopropylidene moiety into the polymer backbone a polyimide has been developed, for use as coatings and adhesives that exhibit desirable characteristics required for many applications.

Although this invention has been shown and described with respect to detailed embodiments thereof, it will be understood by those skilled in the art that various changes in form and detail thereof may be made without departing from the spirit of the claimed invention.

We claim:

1. A thermoplastic polyimide consisting essentially of repeating polymer units of the formula

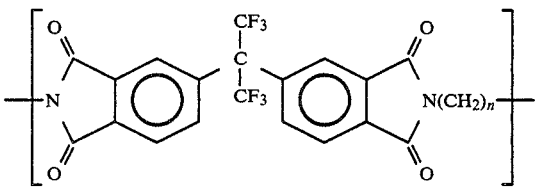

wherein n is 2 to about 20 and the molecular weight of the polymer chain is about 5,000 to about 50,000, said polymer exhibiting the property low temperature processability.

2. The polyimide as recited in claim 1 wherein n is about 10 to about 14.

3. A polyimide as recited in claim 1 wherein n is 12.

4. A method of making the polyimide recited in claim 1 comprising reacting an anhydride with a diamine to form a polyamic acid and imidizing the polyamic acid to form a polyimide wherein the anhydride is 4,4'-(hexafluoroisopropylidene)bis(o-phthalic anhydride) and the diamine is a compound having the formula $H_2N(CH_2)_nNH_2$ where n is 2 to about 20.

5. The method as recited in claim 4 wherein the anhydride is mixed with the diamine by adding the anhydride to the diamine over about 25 to 30 minutes.

* * * * *